(12) United States Patent
Friedrich et al.

(10) Patent No.: US 10,784,919 B2
(45) Date of Patent: Sep. 22, 2020

(54) ADAPTATION CIRCUIT FOR A TRANSCEIVER

(71) Applicant: Intel IP Corporation, Santa Clara, CA (US)

(72) Inventors: Dirk Friedrich, Munich (DE); Peter Laaser, Munich (DE); Josef Holzleitner, Wels (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/306,012

(22) PCT Filed: May 30, 2017

(86) PCT No.: PCT/US2017/034921
§ 371 (c)(1),
(2) Date: Nov. 30, 2018

(87) PCT Pub. No.: WO2018/004917
PCT Pub. Date: Jan. 4, 2018

(65) Prior Publication Data
US 2019/0215029 A1 Jul. 11, 2019

(30) Foreign Application Priority Data
Jul. 1, 2016 (EP) .................................... 16177648

(51) Int. Cl.
*H04B 1/525* (2015.01)
*H04B 1/12* (2006.01)
*H04B 1/408* (2015.01)

(52) U.S. Cl.
CPC ............. *H04B 1/525* (2013.01); *H04B 1/123* (2013.01); *H04B 1/408* (2013.01)

(58) Field of Classification Search
CPC ......... H04B 1/525; H04B 1/408; H04B 1/123
See application file for complete search history.

(56) References Cited

U.S. PATENT DOCUMENTS 4,358,643 A * 11/1982 Levy ...................... H04B 1/586
379/395
4,383,324 A * 5/1983 Dudek ................ H04L 27/2273
329/307

(Continued)

FOREIGN PATENT DOCUMENTS

KR 1020160048680 A 5/2016

*Primary Examiner* — Jean B Corrielus
(74) *Attorney, Agent, or Firm* — 2SPL Patent Attorneys PartG mbB; Kieran O'Leary

(57) ABSTRACT

Examples provide an adaptation circuit and apparatus, method and computer programs for adapting, fabricating and operating, a radio transceiver, a mobile transceiver, a base station transceiver and storage for computer programs or instructions. The adaptation circuit (10) is configured to adapt a local oscillator signal in a radio transceiver (30). The radio transceiver (30) comprises a transmission branch (14) and a reception branch (16), which are subject to cross-talk. The reception branch (16) comprises a local oscillator (18) configured to generate the local oscillator signal. The adaptation circuit (10) comprises a control module (12) configured to determine crosstalk level information between the transmission branch (14) and the reception branch (16), and to adapt the local oscillator signal based on the crosstalk level information.

23 Claims, 5 Drawing Sheets

(56) References Cited

U.S. PATENT DOCUMENTS

| | | | |
|---|---|---|---|
| 2002/0075086 A1* | 6/2002 | Pepper | H03B 5/1847 |
| | | | 331/49 |
| 2003/0099350 A1 | 5/2003 | Bostoen et al. | |
| 2005/0221790 A1 | 10/2005 | Persico et al. | |
| 2008/0089433 A1* | 4/2008 | Cho | H04B 7/0615 |
| | | | 375/267 |
| 2009/0130994 A1 | 5/2009 | Zhuo et al. | |
| 2009/0225912 A1 | 9/2009 | Shih et al. | |
| 2010/0261434 A1* | 10/2010 | Arai | H03J 7/04 |
| | | | 455/73 |
| 2011/0019773 A1* | 1/2011 | Van De Beek | H03D 7/00 |
| | | | 375/340 |
| 2011/0261674 A1* | 10/2011 | Maes | H04B 3/32 |
| | | | 370/201 |
| 2012/0108277 A1* | 5/2012 | Chan | H04W 36/0011 |
| | | | 455/501 |
| 2014/0113576 A1 | 4/2014 | Nentwig et al. | |
| 2015/0003265 A1* | 1/2015 | Mansour | H04W 24/00 |
| | | | 370/252 |
| 2015/0311906 A1 | 10/2015 | Nilsson | |
| 2016/0080032 A1 | 3/2016 | Treyer | |
| 2016/0156310 A1* | 6/2016 | Pretl | H03L 7/07 |
| | | | 331/60 |
| 2016/0277068 A1* | 9/2016 | Heinikoski | H04B 1/0475 |

* cited by examiner

ADAPTATION CIRCUIT FOR A TRANSCEIVER

FIELD

Examples relate to an adaptation concept for an oscillator, and in particular, but not exclusively, to adapting a local oscillator signal in a radio transceiver based on a crosstalk level to balance power consumption and phase noise level of the local oscillator signal.

BACKGROUND

Frequency Division Duplex (FDD) is a concept that is well established in mobile communication systems. Different radio frequencies are used for uplink (from the end terminal to the infrastructure) and downlink (from the infrastructure to the end terminal) communication. For the respective radio front ends cross talk can be a challenge, i.e. signals from the high output power transmission path couple into the low power receive path. Diplexers and Duplexers as well as bandpass filters are common components, which are used in radio front ends to combat such crosstalk. A contributor in today's FDD systems is the phase noise performance of Local Oscillators (LOs), which are utilized in the receiving (Rx) paths of transceivers. For at least some transceivers phase noise performance requirements of a Rx LO signal are determined by the performance of the frontend components of the radio system. Especially, the transmit (Tx) to Rx insulation or attenuation of the frontend components is a point of interest.

BRIEF DESCRIPTION OF THE FIGURES

Some examples of apparatuses, circuits, methods, computer programs, etc. will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

Figure 1:
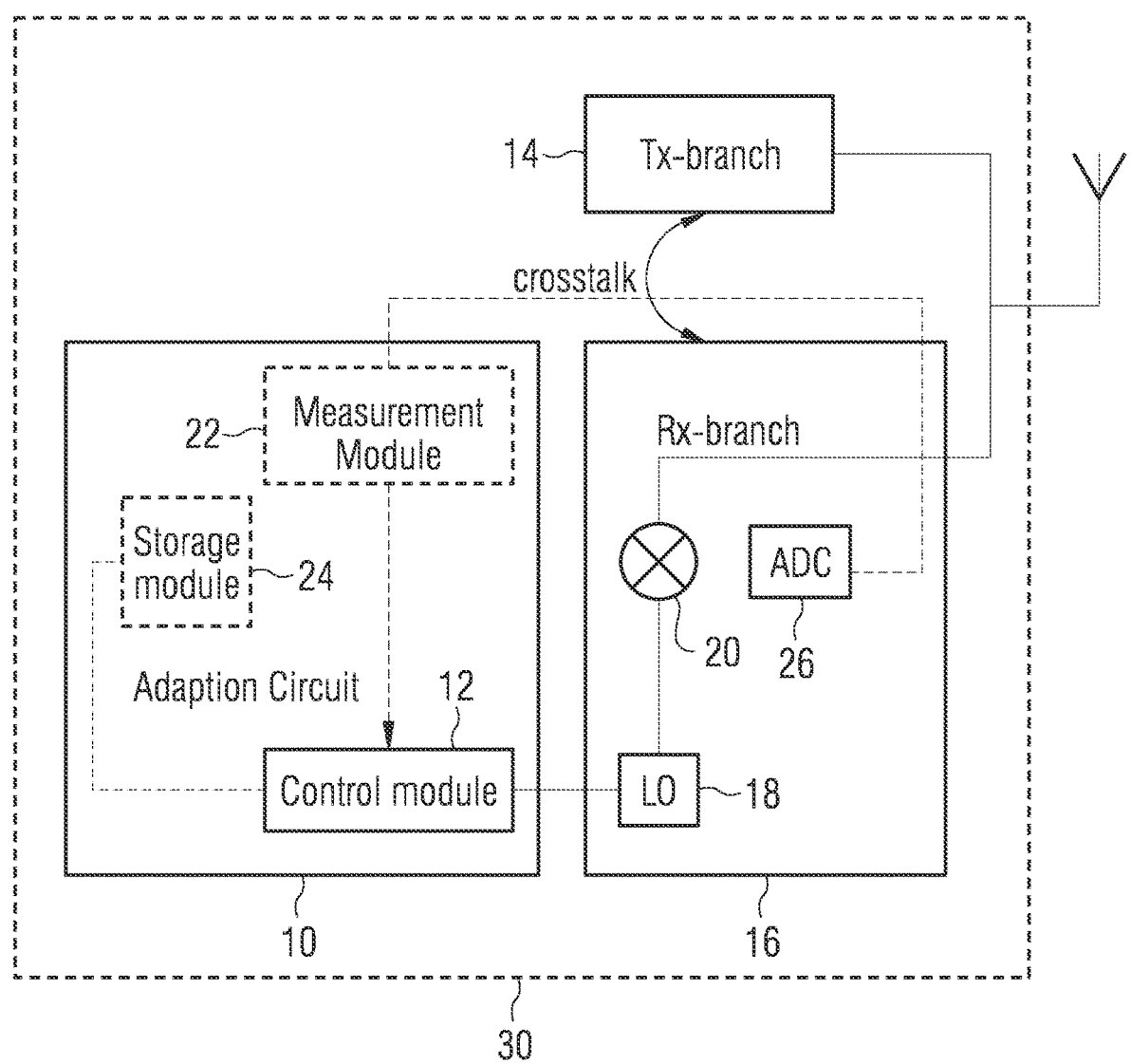
FIG. 1 illustrates an example of an adaptation circuit and an example of an adaptation apparatus.

FIG. 1 illustrates an example of an adaptation circuit 10, an example of an adaptation apparatus 10 respectively. In the example shown in FIG. 1 the apparatus or circuit 10 is shown together with other optional components, which will be detailed in the sequel. The adaptation circuit 10 is configured to adapt a local oscillator signal in a radio transceiver 30. The radio transceiver 30 comprises a transmission branch 14 and a reception branch 16, which are subject to cross-talk. The reception branch 16 comprises a Local Oscillator 18 (LO), which is configured to generate the local oscillator signal. The adaptation circuit 10 comprises a control module 12 configured to determine crosstalk level information between the transmission branch 14 and the reception branch 16. The control module 12 is configured to adapt the local oscillator signal based on the crosstalk level information.

FIG. 1 also fits an example of an adaptation apparatus 10 for adapting a local oscillator signal in a radio transceiver 30, which comprises a transmission branch 14 and a reception branch 16, which are subject to cross-talk. The reception branch 16 comprises a local oscillator 18, which is configured for generating the local oscillator signal. The adaptation apparatus 10 comprises means for controlling 12, which is configured for determining crosstalk level information between the transmission branch 14 and the reception branch 16. The mean for controlling 12 is configured for adapting the local oscillator signal based on the crosstalk level information.

In the following further examples will be described and implementation details for components of the adaptation circuit 10 or the adaptation apparatus 10. Such details of the adaptation circuit 10 may be likewise applied to the adaptation apparatus 10 and vice versa, even if explicit repetition is omitted, "module" features may correspond to the respective "means" features.

In examples the control module 12 and/or means for controlling 12 may be implemented using one or more processing units, one or more processing devices, any means for processing, such as a processor, a computer or a programmable hardware component being operable with accordingly adapted software. In other words, the described function of the control module 12 or means for controlling 12 may as well be implemented in software, which is then executed on one or more programmable hardware components. Such hardware components may comprise a general purpose processor, a Digital Signal Processor (DSP), a micro-controller, etc.

In some further examples a mixer 20 or means for mixing 20 may be comprised in the adaptation circuit 10, the adaptation apparatus 10, and/or the radio transceiver 30 as also indicated in FIG. 1. The mixer 20 may use the LO signal to convert a signal in the reception branch 16 from a reception band into a baseband. It is to be noted that reception and transmission bands may be located at different center frequencies in the spectrum (FDD). During the conversion or mixing process a desired reception band gets converted to the base band, however, undesired signals may also be converted to the base band, e.g. from the transmission band. Such effects may have multiple causes as will be further detailed subsequently. A mixer 20 may be implemented as a non-linear circuit that mixes signals of two different frequencies, wherein a result of mixing comprising multiple frequencies different from the input frequencies.

For example, the output comprises signal components at a sum of the input frequencies and at the difference between the input frequencies, these signals may also be referred to as heterodynes. Other signal components at different frequencies may also be obtained. An unbalanced mixer may, for example, also produce components at the same frequencies as the input signals at its output. Such signals may be obtained by realizing a summation and/or multiplication of the input signals, which can be achieved using a non-linear component, e.g. a diode or a transistor. Single balanced mixers may provide only one of the input frequencies at their output; double balanced mixer may suppress any input frequency at the output.

Mixers are, for example, used to shift signals in the frequency domain (convolution in the frequency domain corresponds to multiplication in the time domain). Such frequency shifts are desirable when converting signals from a reception band to another band, e.g. an intermediate frequency or a baseband. Signals at other frequencies, which are also generated when mixing, are mostly suppressed using accordingly tuned or adapted filter mechanisms.

However, when applying mixing in such processing other signals or unwanted signals (e.g. from the transmission band) also get shifted in the frequency domain and components of these may end up as interference or unwanted signals negatively influencing wanted signals and leading to decreased reception quality, errors, re-transmissions, service outage, etc. In examples any type of mixer may be used as heterodynes are the signals of interest.

Figure 2:
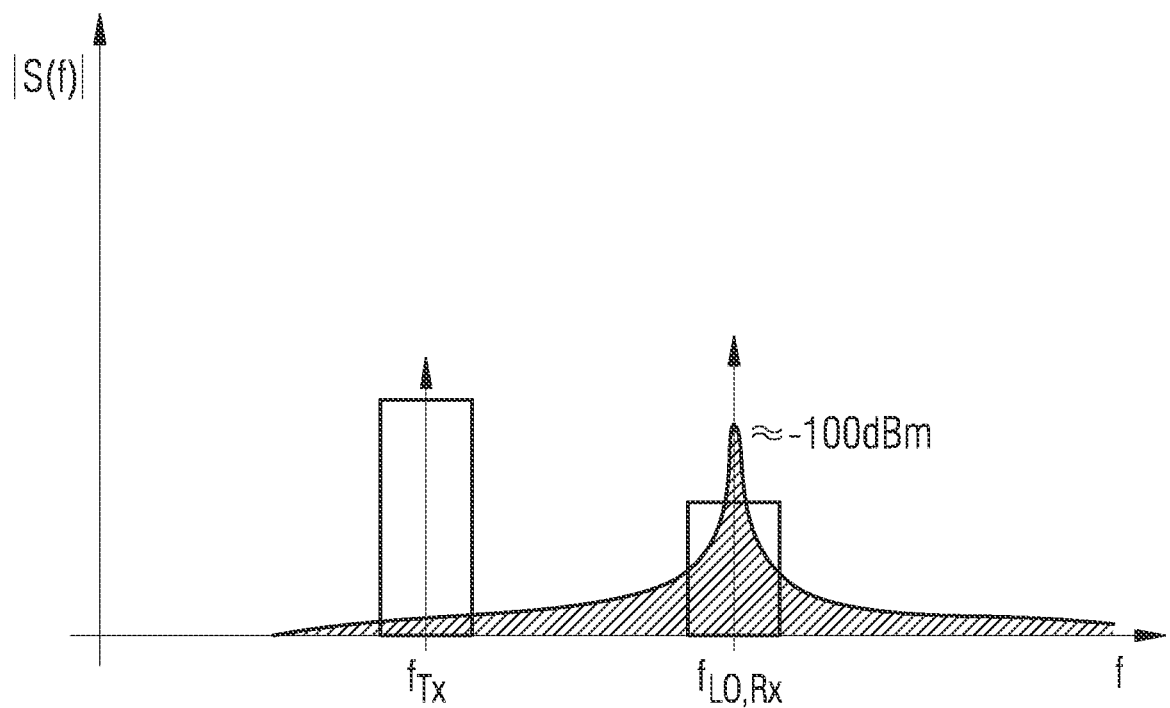
FIG. 2 shows spectral relations leading to crosstalk development in an example.
Figure 2:
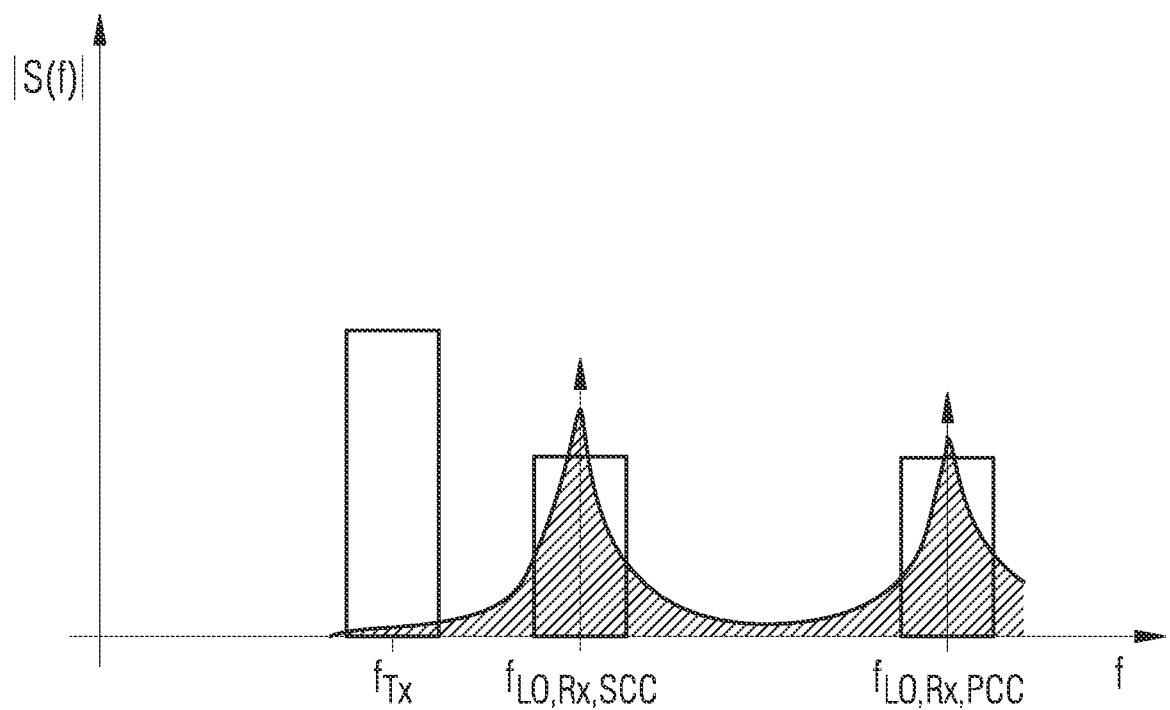

FIG. 2 shows spectral relations leading to crosstalk development in an example. FIG. 2 shows two spectral power densities, i.e. frequency on the abscissae and power density on the ordinate. The view graph at the top shows a reception band with center frequency at $f_{LO,Rx}$. Ideally, a local oscillator signal as input into a mixer would have spectrum with a sharp impulse pulse (ideal Dirac impulse, theoretically). Practically however, the spectrum of the LO signal is not perfect but has spectral power that leaks on the side of the main impulse as indicated at the top of FIG. 2. Reasons for this are imperfections in the LO 18, such as imperfections in its components, limited switching times, limited slew rates, noise generated by components, etc. For example, the spectrum of an LO signal may have a maximum at $f_{LO,Rx}$ an then a side band power density proportional to $1/f_{Offset}$, where $f_{Offset}$ is the magnitude of a spectral distance to the center frequency, e.g. the noise density of the side bands may be proportional to $1/|f_{LO,Rx}-f_{Offset}|$, as indicated by the hachured spectrum in FIG. 2. FIG. 2 also shows a reception band centered at $f_{LO,Rx}$ and a transmission band centered at $f_{Tx}$, both indicated by the respective rectangular sections.

Figure 3:
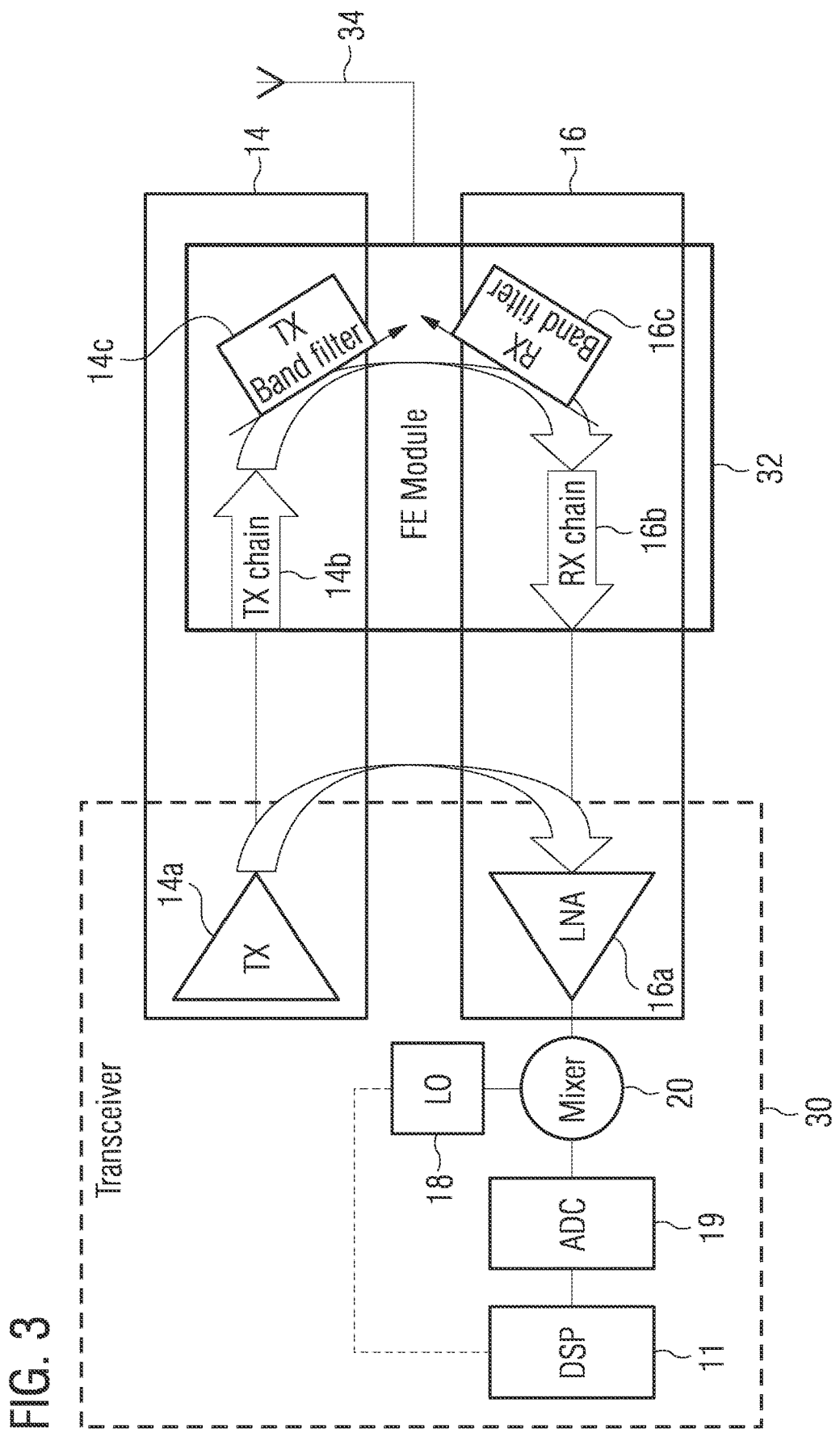
FIG. 3 illustrates crosstalk development in an example.

FIG. 3 illustrates crosstalk development in an example, which shows a typical crosstalk scenario. FIG. 3 shows an example of a radio transceiver 30 with a Tx branch 14 comprising a Power Amplifier (PA) 14a symbol, in FIG. 3 outputting a transmit signal to a Front End (FE) module 32. The amplified transmit signal is output to a Tx processing chain 14b and then further provided to a Tx band-filter 14c before being coupled to an antenna 34, which serves as transmit and receive antenna 34. An Rx branch 16 is also coupled to the antenna 34. The FE 32 comprises an Rx band filter 16c, which filters a signal received by the antenna 34 and provides the filtered signal to an Rx processing chain 16b, before the processed signal is amplified by a Low Noise Amplifier (LNA) 16a. The output of the LNA 16a is then input into mixer 20 and the output of the mixer 20 is then converted from the analog domain to the digital domain using an Analog-to-Digital Converter (ADC) 19. The output of the ADC 19 is further processed by a DSP 11, implementing the adaptation circuit 10 in this example. The DSP 11 also controls the LO 18 providing an LO signal to the mixer 20.

The Tx signal is feed via a bandpass filter 14c to the antenna 34. The Rx signal is feed via another band-pass filter 16c to the LNA 16a. In a worst case the insulation or attenuation of the Tx signal in the Rx signal path in the Rx frequency band is assumed to be in the range of 50 dB. This may depend on implementation details but at least in some examples it can be assumed that 50 dB is the worst case. Due to limited phase noise performance of the Rx LO signal at the Tx signal frequency, the Tx signal gets mixed down by the Rx LO signal into the Rx baseband frequency domain and overlaps with the wanted Rx signal, reducing the Signal-to-Noise-Ratio (SNR) of the Rx signal. This is also indicated in FIG. 2 at the top showing some degree of overlap between the Tx band and the declining edges of the LO signal spectrum.

Therefore, the phase noise performance requirements of the Rx LO signal directly depends on the Tx to Rx isolation/insulation/attenuation number of the front end components 32 and the SNR requirements in the Rx branch 16. In some examples the crosstalk level information may comprise insulation or attenuation information between the transmission branch 14 and the reception branch 16. Such information may correspond to any measure, value or parameter that may represent a crosstalk level. Furthermore, strict LO phase noise performance requirements may increase the power consumption of the LO 18, and hence increase the power that has to be provided for fulfilling the Rx LO 18 phase noise requirements.

In an example, the Tx signal power at the PA 14a output may be +24 dBm. The FE 32 attenuation of the Tx output signal in the Rx frequency band (crosstalk level information in terms of an attenuation or insulation) is −50 dB. Hence the Tx signal power at the Rx LNA 16a input is −26 dBm. For comparison, a wanted Rx signal power at the LNA 16a input may be −100 dBm, i.e. at the Rx LNA 16a input the Tx signal power is 74 dB above the wanted Rx signal power.

An interesting point is that Rx level plan calculations and specifications of Rx LO phase noise requirements could be based on a worst case scenario assuming 50 dB attenuation of the Tx signal in the FE module 32. In fact, in a nominal case the attenuation of the Tx signal in the FE module 32 may be 10 dB to 15 dB larger than assumed in worst case conditions. Accordingly in a nominal case the phase noise requirement of the Rx LO can be reduced by 10 . . . 15 dB and the current consumption of the Rx LO 18 can be reduced accordingly. Furthermore as indicated in FIG. 2 at the top, a crosstalk level also depends on a duplex spacing between the Tx band ($f_{Tx}$) and the Rx band ($f_{LO,Rx}$). As can be easily seen from the view graph at the top of FIG. 2 the narrower the two bands are located in the spectrum the higher a crosstalk level may be for a given crosstalk characteristic, side band power density, respectively. For example, in a Long Term Evolution (LTE) mobile communication system a typical frequency may be $f_{LO,Rx}$=1980 MHz with a duplex spacing of 80 MHz (LTE, Band 2 with 10 MHz bandwidth). At the bottom of FIG. 2 there is another view graph illustrating a carrier aggregation scenario in an LTE example. So for example, two carriers may be used in the downlink, i.e. two Rx bands from the perspective of a User Equipment (UE).

In the $3^{rd}$ Generation Partnership terminology there can be a Primary Carrier Component (PCC) and at least one Secondary Carrier Component (SCC), for example both using 10 MHz bandwidth. In the view graph of FIG. 2 at the bottom such a scenario is exemplified with PCC frequency $f_{LO,Rx,PCC}$ and SCC frequency $f_{LO,Rx,SCC}$. The system may configure the SCC based on multiple available options and the SCC may happen to be closer to the Tx band at $f_{Tx}$ than the PCC. The crosstalk level may hence not only depend on the duplex spacing between the PCC and the Tx band but also on the (duplex) spacing between the SCC and the Tx band and different configurations or assignments may result in different crosstalk levels. It is to be noted that in the example of LTE the assignment of the PCC and SCC, in particular the SCC band, may be dynamic, depending on the available bands, the load in the network, interference conditions, etc.

The radio could be designed for the worst case conditions. Examples are based on the finding that in a majority of cases such a radio design, configuration or setting may result in an overachievement of the requirements and a waste of power. In some examples the control module 12 is configured to determine the crosstalk level information based on a spectral distance between a transmission band and a reception band of the radio transceiver 30. For example, the control module 12 is configured to determine the crosstalk level information based on a configuration of the radio transceiver 30 in a mobile communication system. Some examples may determine the real Tx to Rx isolation, insulation or attenuation by measuring or testing, and the power consumption of Rx LO 18 can be reduced accordingly.

It is to be noted that in some examples the actual transmission power in the transmission branch 14 is also considered. For example, for a given attenuation between the transmission branch 14 and the reception branch 16 the absolute crosstalk power may be determined by an actual power used in the transmission branch and some examples may use crosstalk level information comprising transmission power information on a transmission power used in the transmission branch 14. As a number example, a maximum transmission power may be 24 dBm. In case there is only short range communication (low pathloss, low attenuation, short range to a receiver e.g. a base station) or favorable radio channel conditions an actual transmission power may be 0 dBm. Having a transmission power reduction of 24 dBm may allow for a higher phase noise level at the LO 18 and hence power may be conserved for the LO 18, cf. FIG. 2.

The control module 12 may be configured to adapt a phase noise level of the LO 18 based on the cross talk level information. There are several options on how the phase noise level of the LO 18 can be influenced or adapted. In some examples the control module 12 is configured to adapt at least one of the group of a power supply, an amplitude, a drive strength, a supply current, a swing and a slew rate of the local oscillator 18 based on the crosstalk level information. For example, components of the LO 18 may be influenced in their accuracy through the power supply, e.g. a supply voltage or current. Jitter, slew rates, latency times etc. may depend on the power supplied. Moreover, for example, driver stage may offer utilization of parallel driver structures, which can be activated, e.g. in terms of switches or controllable power supplies. The more structures are activated in parallel the more exact or accurate the output signal may be (reaction/latency times, slew rates etc.) on the one hand. On the other hand, the more parallel structures are activated, the higher the power consumption of the driver stage. The drive strength may determine how many structures are activated in parallel and may hence influence the phase noise level.

A phase noise component of the local oscillator 18 may depend on a power supply setting of the local oscillator 18. The control module 12 may be configured to adapt the local oscillator signal by controlling the power supply setting based on a predetermined crosstalk level threshold. In radio transmission the output power may be very well controlled. So the insulation/attenuation/isolation between the Rx branch 16 and the Tx branch 14 may be directly measured by the adaptation circuit or apparatus 10. In some examples the adaptation circuit or apparatus 10 may comprise a measurement module 22, which is configured to determine signal quality information in the reception branch 16. The measurement module 22, means for measuring 22, respectively, is illustrated as optional component in FIG. 1. The control module 12 may be configured to control the measurement module 22 in some examples.

The measurement module 22 may have different implementations in different examples, for example signal levels may be measured using accordingly adapted sensors, e.g. a resistor for voltage measurements. The measurement module 22 may comprise certain decoding means in order measure a signal having a particular coding. The measurement module 22 may comprise filters configured for or adapted to certain signal properties, e.g. matched filters, band pass filters, high- or low pass filters etc. As will be further detailed subsequently, the measurement module 22 may comprise an analog-digital converter or a wideband receive signal strength indicator module.

In the following examples the control module 12 is configured to output a control signal for controlling the local oscillator 18, as indicated in FIG. 1 by the coupling between the control module 12 and the local oscillator 18. The control module 12 may be configured to adapt the local oscillator signal using the control signal based on the signal quality information. In some examples the adaptation circuit or apparatus 10 may comprise a storage module 24 configured to store adaptation information for the local oscillator 18. The storage module is also shown in FIG. 1 as optional component. Such stored information may then be re-used after being read from the storage module 24. In this perspective examples may also serve calibration purposes, e.g. the actual crosstalk may be determined based on a certain configuration and then be re-read from the storage or memory 24. The adaptation information may comprise setting or configuration information for the local oscillator 18, for example, such that a former phase noise level can be restored. In examples such a memory or storage 24 may be a flash memory, a volatile- or non-volatile memory, Random Access Memory (RAM), Dynamic RAM (DRAM), Static RAM (SRAM), or any kind of memory.

In an example the Rx LO frequency is set to the Tx frequency and the Tx signal is directly down-mixed into the baseband frequency domain. The amplitude of the Tx signal can be estimated as signal quality information by evaluation of a digital ADC (Analog-Digital-Converter) output signals. The control module 12 is then configured to output an activation signal for the transmission branch 14. The control module 12 is configured to activate the transmission branch 14 and to set a local oscillator frequency to a transmission frequency. The control module 12 is further configured to determine the crosstalk level information based on a signal level of the transmission frequency in the reception branch 16. The reception branch 16 then comprises an ADC 26, as shown as optional component in FIG. 1. In another implementation of an example of the measurement module 22 may comprise the ADC 26. The control module 12 is configured to determine the signal level of the transmission frequency by evaluating a digital output of the ADC 26. For example an output level of the ADC 26 may be determined and based on the set transmission power an attenuation or isolation between the Tx branch 14 and the Rx branch 16 can be determined as crosstalk level information.

In another example the Rx LO frequency is set to the Rx frequency and the amplitude of the Tx signal is measured by a wide-band Receive-Signal-Strength-Indicator (RSSI) module, e.g. a measurement module 22 with an according bandwidth. With the measurement results the Rx LO path (supply, amplitude, slew rate) can be set accordingly. The control module 12 is then configured to activate the transmission branch 14 and to set a local oscillator frequency to a reception frequency. The control module 12 is then further configured to determine the crosstalk level information based on receive signal strength indicator information.

In another example the transmission branch 14 or radio is set to maximum power and an Rx reference sensitivity measurement is carried out. The power consumption of the Rx LO path is decreased until a change in reference sensitivity can be observed. The control module 12 is then configured to activate the transmission branch 14 and to set the transmission branch 14 to maximum transmission power. The control module 12 is also configured to set a local oscillator frequency to a reception frequency, and to determine the crosstalk level information based on a change in a receive sensitivity of the reception branch 16 dependent on a power setting of the local oscillator 18. In examples, different methods may be utilized to carry out a receive sensitivity measurement. For example, the reference sensitivity may be the minimum receiver input power measured at the antenna connector at which a Frame-Error-Rate/Bit-Error-Rate (FER/BER) does not exceed a specific value, e.g. 0.01, 0.001 in line with the 3GPP specifications. In further examples any other sensitivity measure or means may be utilized.

The above examples are applicable for a radio fabrication (FAB) calibration. They may also be applied in the field for on-demand calibration. Examples therefore also provide a calibration circuit or apparatus comprising the above adaptation circuit 10 or apparatus 10. Instead of designing the Rx for worst case conditions examples may determine the actual crosstalk situation and may then tune or adapt the LO 18 accordingly. Measurements in current cellular radio show that the Rx LO 18 current may be reduced by 4-6 mA (referred to Rx LO supply) for each Rx channel. Taking into account that up to 4 Rx channels may be online or active (in a two carrier aggregation scenario) examples may save ~26 mA in a radio module or transceiver 30. Examples may enable to configure a radio module or radio transceiver 30 regarding high performance and low power. Examples may provide more freedom to support different frontend modules, e.g. from different suppliers or having different accuracies, tolerances, respectively.

Figure 4:
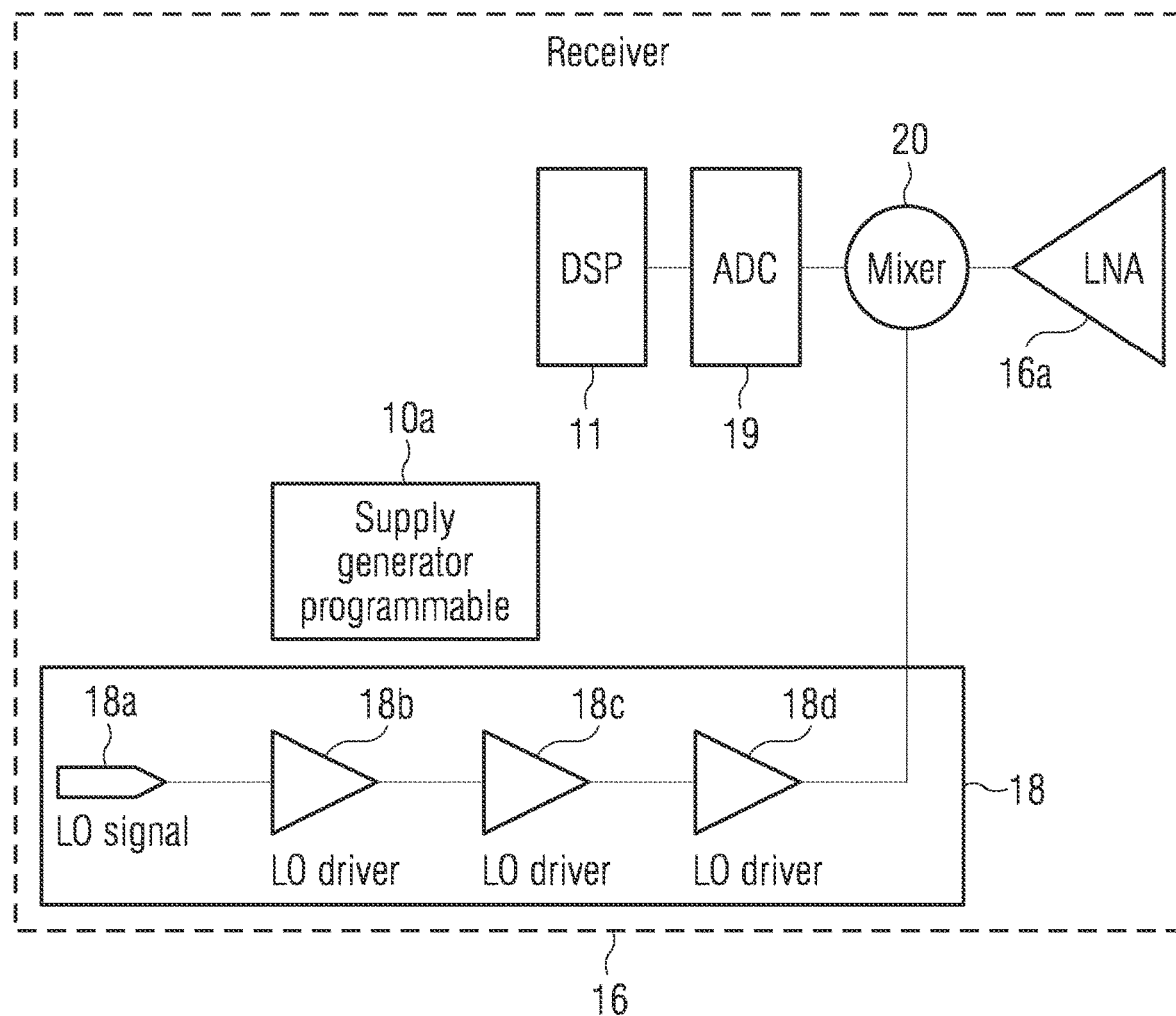
FIG. 4 shows a block diagram of an example receiver.

FIG. 4 shows a block diagram of a receiver branch 16 in an example transceiver 30. In the example shown in FIG. 4 the adaptation circuit 10 is configured to provide a control signal to a programmable supply generator 10*a* in the receiver branch 16, which sets the supply configuration or setting for the LO 18. The LO 18 itself comprises an LO signal generator 18*a* and three LO driver stages 18*b*, 18*c*, and 18*d*. In other examples the LO 18 may as well be implemented using a different terrestrial number of LO driver stages. The output of the LO driver stages is the input into a mixer 20, to which an output signal of an LNA 16*a* is also input. The mixed signal is then converted by ADC 19 and input into a DSP 11, which may also implement the adaptation circuit or apparatus 10. In this example the Rx LO 18 adjustments or adaptations can be done via adaptation of the supply voltage 10*a*. Therefore the internal supply generator (Low-Drop-Out regulator, LDO) 10*a* provides a sufficient range of adjustment. This range may depend on technology, a supported frequency range, and the targeted Rx performance. The Rx LO 18 adjustment or adaptation may be done via programmable LO driver stages 18*b*, 18*c*, 18*d* or LO driver modes. These programming options may include the driver strength, the driver swing and the driver mode (e.g. single ended or differential).

Figure 5:
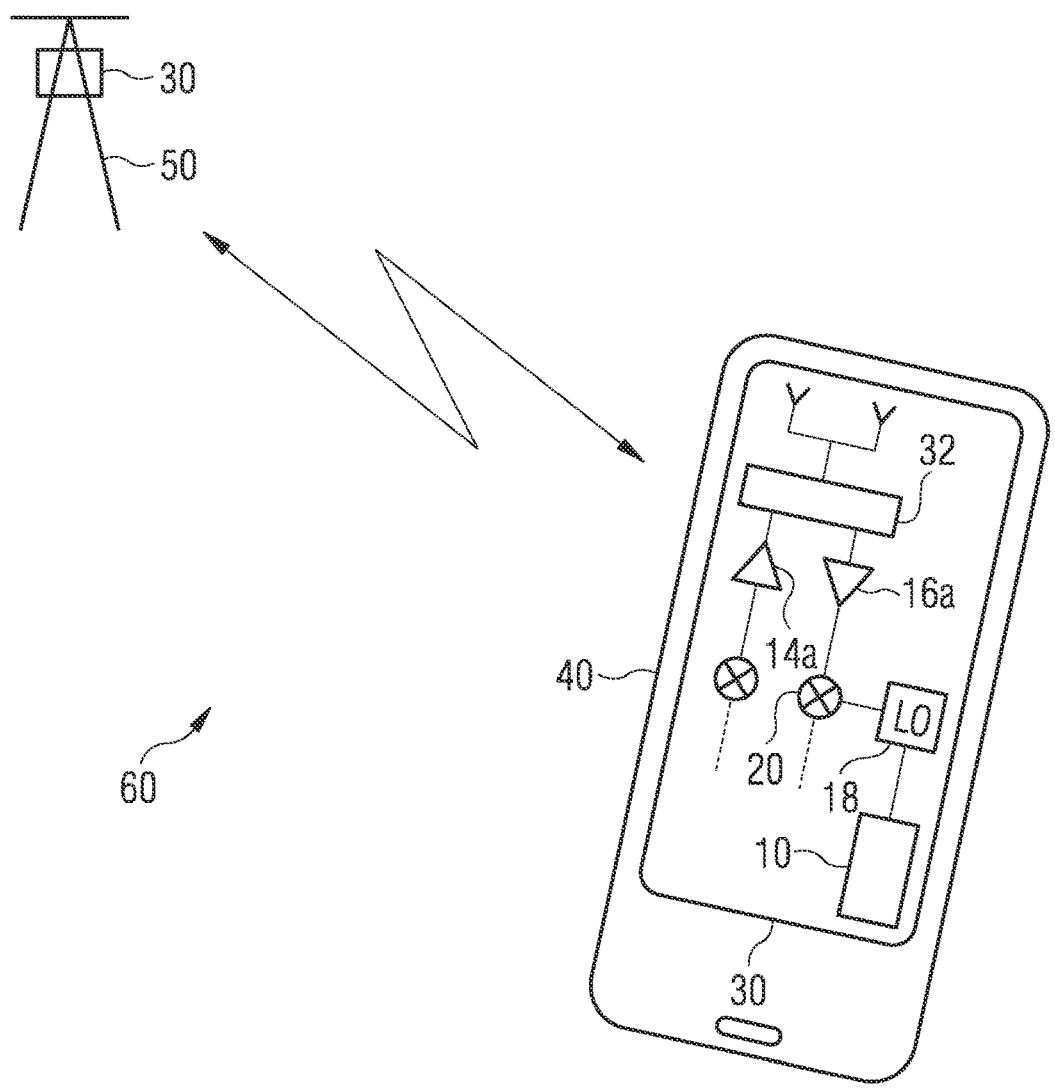
FIG. 5 illustrates examples of a mobile transceiver and a base station transceiver.

FIG. 5 illustrates examples of a mobile transceiver 40 and a base station transceiver 50. The mobile transceiver 40 comprises the above described radio transceiver 30 with an example of the adaptation circuit 10 or apparatus 10. Although power saving may be more critical in a mobile transceiver 40 than in a base station transceiver 50, examples also provide a base station transceiver 50 with the above described radio transceiver 30 with an example of the adaptation circuit 10 or apparatus 10. The example radio transceivers 30 shown in FIG. 5 comprise similar components as the radio transceivers 30 described in the previous examples. Same or similar reference signs reference the same or similar components.

FIG. 5 illustrates also an example of a mobile communication system 60, comprising the mobile transceiver 40 and the base station transceiver 50. The mobile communication system 60 may correspond, for example, to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station or base station transceiver 50 can be operable to communicate with one or more active mobile transceivers 40 and a base station transceiver 50 can be located in or adjacent to a coverage area of another base station transceiver, e.g. a macro cell base station transceiver or small cell base station transceiver. Hence, examples may provide a mobile communication system 60 comprising one or more mobile transceivers 40 and one or more base station transceivers 50, wherein the base station transceivers 50 may establish macro cells or small cells, as e.g. pico-, metro-, or femto cells. A mobile transceiver 40 may correspond to a smartphone, a cell phone, user equipment, a laptop, a notebook, a personal computer, a Personal Digital Assistant (PDA), a Universal Serial Bus (USB)-stick, a car, etc. A mobile transceiver 40 may also be referred to as User Equipment (UE) or mobile in line with the 3GPP terminology.

A base station transceiver 50 can be located in the fixed or stationary part of the network or system. A base station transceiver 50 may correspond to a remote radio head, a transmission point, an access point, a macro cell, a small cell, a micro cell, a femto cell, a metro cell etc. A base station transceiver 50 can be a wireless interface of a wired network, which enables transmission of radio signals to a UE or mobile transceiver 40. Such a radio signal may comply with radio signals as, for example, standardized by 3GPP or, generally, in line with one or more of the above listed systems. Thus, a base station transceiver 50 may correspond to a NodeB, an eNodeB, a Base Transceiver Station (BTS), an access point, a remote radio head, a transmission point etc., which may be further subdivided in a remote unit and a central unit.

Figure 6:
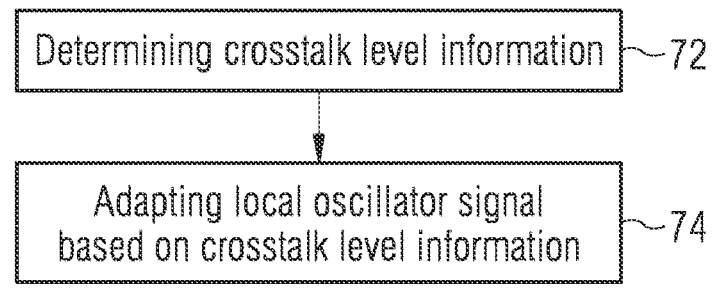
FIG. 6 shows a block diagram of an example of a method for adapting a local oscillator signal.

FIG. 6 shows a block diagram of an example of a method for adapting a local oscillator signal in a radio transceiver 30. The radio transceiver 30 comprises a transmission branch 14 and a reception branch 16, which are subject to cross-talk. The reception branch 16 comprising a local oscillator 18 configured for generating the local oscillator signal, as shown in FIG. 1. The adaptation method comprises determining 72 crosstalk level information between the transmission branch 14 and the reception branch 16. The method comprises adapting 74 the local oscillator signal based on the crosstalk level information.

Another example is a method for fabricating a radio transceiver 30 comprising one of the methods described herein. Yet another example is a method for operating a radio transceiver 30 comprising performing one of the methods described herein on demand.

Another example is a computer program having a program code for performing at least one of the above methods, when the computer program is executed on a computer, a processor, or a programmable hardware component. Yet another example is a computer readable storage medium storing instructions which, when executed by a computer, processor, or programmable hardware component, cause the computer to implement one of the methods described herein.

The examples as described herein may be summarized as follows:

A first example is an adaptation circuit 10 configured to adapt a local oscillator signal in a radio transceiver 30. The radio transceiver 30 comprises a transmission branch 14 and a reception branch 16, which are subject to cross-talk, the reception branch 16 comprising a local oscillator 18 configured to generate the local oscillator signal. The adaptation circuit 10 comprises a control module 12 configured to determine crosstalk level information between the transmission branch 14 and the reception branch 16, and to adapt the local oscillator signal based on the crosstalk level information.

In example 2 the crosstalk level information comprises insulation or attenuation information between the transmission branch 14 and the reception branch 16.

Example 3 is the adaptation circuit 10 of one of the examples 1 or 2, wherein the control module 12 is configured to determine the crosstalk level information based on a spectral distance between a transmission band and a reception band of the radio transceiver 30.

Example 4 is the adaptation circuit 10 of example 3, wherein the control module 12 is configured to determine the crosstalk level information based on a configuration of the radio transceiver 30 in a mobile communication system 60.

Example 5 is the adaptation circuit 10 of one of the examples 1 to 4, wherein the control module 12 is configured to adapt a phase noise level of the local oscillator 18 based on the cross talk level information.

Example 6 is the adaptation circuit 10 of one of the examples 1 to 5, wherein the crosstalk level information comprises transmission power information on a transmission power used in the transmission branch 14.

Example 7 is the adaptation circuit 10 of one of the examples 1 to 6, wherein the control module 12 is configured to adapt at least one of the group of a power supply, an amplitude, a drive strength, a supply current, a swing and a slew rate of the local oscillator 18 based on the crosstalk level information.

Example 8 is the adaptation circuit 10 of one of the examples 1 to 7, wherein a phase noise component of the local oscillator 18 depends on a power supply setting of the local oscillator 18, and wherein the control module 12 is configured to adapt the local oscillator signal by controlling the power supply setting based on a predetermined crosstalk level threshold.

Example 9 is the adaptation circuit 10 of one of the examples 1 to 8, comprising a measurement module 22 configured to determine signal quality information in the reception branch 16, and wherein the control module 12 is configured to control the measurement module 22.

Example 10 is the adaptation circuit 10 of example 9, wherein the measurement module 22 comprises an analog-digital converter or a wideband receive signal strength indicator module.

Example 11 is the adaptation circuit 10 of one of the examples 1 to 10, wherein the control module 12 is configured to output a control signal for controlling the local oscillator 18 and wherein the control module 12 is configured to output an activation signal for the transmission branch 14.

Example 12 is the adaptation circuit 10 of example 11, wherein the control module 12 is configured to adapt the local oscillator signal using the control signal based on the signal quality information.

Example 13 is the adaptation circuit 10 of one of the examples 1 to 12, comprising a storage module 24 configured to store adaptation information for the local oscillator 18.

Example 14 is the adaptation circuit 10 of example 13, wherein the adaptation information comprises setting or configuration information for the local oscillator 18.

Example 15 is the adaptation circuit 10 of one of the examples 1 to 14, wherein the control module 12 is configured to activate the transmission branch 14, to set a local oscillator frequency to a transmission frequency, and to determine the crosstalk level information based on a signal level of the transmission frequency in the reception branch 16.

Example 16 is the adaptation circuit 10 of example 16, wherein the reception branch 16 comprises an analog-digital converter 26, and wherein the control module 12 is configured to determine the signal level of the transmission frequency by evaluating a digital output of the analog-digital converter 26.

Example 17 is the adaptation circuit 10 of one of the examples 1 to 16, wherein the control module 12 is configured to activate the transmission branch 14, to set a local oscillator frequency to a reception frequency, and to determine the crosstalk level information based on receive signal strength indicator information.

Example 18 is the adaptation circuit 10 of one of the examples 1 to 17, wherein the control module 12 is configured to activate the transmission branch 14 and set the transmission branch 14 to maximum transmission power, to set a local oscillator frequency to a reception frequency, and to determine the crosstalk level information based on a change in a receive sensitivity of the reception branch 16 dependent on a power setting of the local oscillator 18.

Example 19 is the adaptation circuit 10 of one of the examples 1 to 18 further comprising a mixer 20, which is coupled to the local oscillator 18.

Example 20 is an adaptation apparatus 10 for adapting a local oscillator signal in a radio transceiver 30. The transceiver 30 comprises a transmission branch 14 and a reception branch 16, which are subject to cross-talk. The reception branch 16 comprises a local oscillator 18 configured for generating the local oscillator signal. The adaptation apparatus 10 comprises means for controlling 12 configured for determining crosstalk level information between the transmission branch 14 and the reception branch 16, and for adapting the local oscillator signal based on the crosstalk level information.

Example 21 is the adaptation apparatus 10 of example 20, wherein the crosstalk level information comprises insulation or attenuation information between the transmission branch 14 and the reception branch 16.

Example 22 is the adaptation apparatus 10 of one of the examples 20 or 21, wherein the means for controlling 12 is configured for determining the crosstalk level information based on a spectral distance between a transmission band and a reception band of the radio transceiver 30.

Example 23 is the adaptation apparatus 10 of one of the examples 20 to 22, wherein the means for controlling 12 is configured for determining the crosstalk level information based on a configuration of the radio transceiver 30 in a mobile communication system 60.

Example 24 is the adaptation apparatus 10 of one of the examples 20 to 23, wherein the means for controlling 12 is configured for adapting a phase noise level of the local oscillator 18 based on the cross talk level information.

Example 25 is the adaptation apparatus 10 of one of the examples 20 to 24, wherein the crosstalk level information comprises transmission power information on a transmission power used in the transmission branch 14.

Example 26 is the adaptation apparatus 10 of one of the examples 20 to 25, wherein the means for controlling 12 is configured for adapting at least one of the group of a power supply, an amplitude, a drive strength, a supply current, a swing and a slew rate of the local oscillator 18 based on the crosstalk level information.

Example 27 is the adaptation apparatus 10 of one of the examples 20 to 26, wherein a phase noise component of the local oscillator 18 depends on a power supply setting of the local oscillator 18, and wherein the means for controlling 12 is configured for adapting the local oscillator signal by controlling the power supply setting based on a predetermined cross talk level threshold.

Example 28 is the adaptation apparatus 10 of one of the examples 20 to 27, comprising means for measuring signal quality information in the reception branch 16, and wherein the means for controlling 12 is configured for controlling the means for measuring.

Example 29 is the adaptation apparatus 10 of example 28, wherein the means for measuring 22 comprises an analog-digital converter or a wideband receive signal strength indicator module.

Example 30 is the adaptation apparatus 10 of one of the examples 20 to 29, wherein the means for controlling 12 is configured for outputting a control signal for controlling the local oscillator 18 and wherein the means for controlling 12 is configured for outputting an activation signal for the transmission branch 14.

Example 31 is the adaptation apparatus 10 of example 30, wherein the means for controlling 12 is configured for adapting the local oscillator signal using the control signal based on the signal quality information.

Example 32 is the adaptation apparatus 10 of one of the examples 20 to 31, comprising means for storing 24 adaptation information for the local oscillator 18.

Example 33 is the adaptation apparatus 10 of example 32, wherein the adaptation information comprises setting or configuration information for the local oscillator 18.

Example 34 is the adaptation apparatus 10 of one of the examples 20 to 33, wherein the means for controlling 12 is configured for activating the transmission branch 14, for setting a local oscillator frequency to a transmission frequency, and for determining the crosstalk level information based on a signal level of the trans-mission frequency in the reception branch 16.

Example 35 is the adaptation apparatus 10 of example 34, wherein the reception branch 16 further comprises an analog-digital converter, and wherein the means for controlling 12 is configured for determining the signal level of the transmission frequency by evaluating a digital output of the analog-digital converter 26.

Example 36 is the adaptation apparatus 10 of one of the examples 20 to 35, wherein means for controlling 12 is configured for activating the transmission branch 14, for setting a local oscillator frequency to a reception frequency, and for determining the crosstalk level information based on receive signal strength indicator information.

Example 37 is the adaptation apparatus 10 of one of the examples 20 to 36, wherein the means for controlling 12 is configured for activating the transmission branch 14 and setting the transmission branch 14 to maximum transmission power, for setting a local oscillator frequency to a reception frequency, and for determining the crosstalk level information based on a change in a receive sensitivity of the reception branch 16 dependent on a power setting of the local oscillator 18.

Example 38 is the adaptation apparatus 10 of one of the examples 20 to 37 further comprising means for mixing 20, which is coupled to the local oscillator 18.

Example 39 is an adaptation method for adapting a local oscillator signal in a radio transceiver 30, the radio transceiver 30 comprising a transmission branch 14 and a reception branch 16, which are subject to cross-talk, the reception branch 16 comprising a local oscillator 18 configured for generating the local oscillator signal, the adaptation method comprising determining 72 crosstalk level information between the transmission branch 14 and the reception branch 16; and adapting 74 the local oscillator signal based on the crosstalk level information.

Example 40 is the method of example 39, wherein the crosstalk level information comprises insulation or attenuation information between the transmission branch 14 and the reception branch 16.

Example 41 is the method of one of the examples 39 or 40, comprising determining the crosstalk level information based on a spectral distance between a transmission band and a reception band of the radio transceiver 30.

Example 42 is the method of one of the examples 39 to 41, comprising determining the crosstalk level information based on a configuration of the radio transceiver 30 in a mobile communication system 60.

Example 43 is the method of one of the examples 39 to 42, comprising adapting a phase noise level of the local oscillator 18 based on the cross talk level information.

Example 44 is the method of one of the examples 39 to 43, wherein the crosstalk level information comprises transmission power information on a transmission power used in the transmission branch 14.

Example 45 is the method of one of the examples 39 to 44, comprising adapting at least one of the group of a power supply, an amplitude, a drive strength, a supply current, a swing and a slew rate of the local oscillator 18 based on the crosstalk level information.

Example 46 is the method of one of the examples 39 to 45, wherein a phase noise component of the local oscillator 18 depends on a power supply setting of the local oscillator 18, and comprising adapting the local oscillator signal by controlling the power supply setting based on a predetermined cross talk level threshold.

Example 47 is the method of one of the examples 39 to 46, comprising measuring signal quality in-formation in the reception branch 16.

Example 48 is the method of example 47, comprising measuring using an analog-digital converter or a wideband receive signal strength indicator module.

Example 49 is the method of one of the examples 39 to 48, comprising outputting a control signal for controlling the local oscillator 18 and outputting an activation signal for the transmission branch 14.

Example 50 is the method of example 49, comprising adapting the local oscillator signal using the control signal based on the signal quality information.

Example 51 is the method of one of the examples 39 to 50, comprising storing adaptation information for the local oscillator 18.

Example 52 is the method of example 51, wherein the adaptation information comprises setting or configuration information for the local oscillator 18.

Example 53 is the method of one of the examples 39 to 52, comprising activating the transmission branch 14, setting a local oscillator frequency to a transmission frequency, and determining the crosstalk level information based on a signal level of the trans-mission frequency in the reception branch 16.

Example 54 is the method of example 53, comprising determining the signal level of the transmission frequency by evaluating a digital output of an analog-digital converter.

Example 55 is the method of one of the examples 39 to 54, comprising activating the transmission branch 14, setting a local oscillator frequency to a reception frequency, and determining the crosstalk level information based on receive signal strength indicator information.

Example 56 is the method of one of the examples 39 to 55, comprising activating the transmission branch 14 and setting the transmission branch 14 to maximum transmission power, setting a local oscillator frequency to a reception frequency, and determining the crosstalk level information based on a change in a receive sensitivity of the reception branch 16 dependent on a power setting of the local oscillator 18.

Example 57 is the method of one of the examples 39 to 56 further comprising mixing.

Example 58 is a method for fabricating a radio transceiver 30 comprising one of the methods of examples 39 to 57.

Example 59 is a method for operating a radio transceiver 30 comprising performing one of the methods of example 39 to 58 on demand.

Example 60 is a radio transceiver 30 comprising the adaptation circuit 10 of one of the examples 1 to 19 or the adaptation apparatus 10 of one of the examples 20 to 38.

Example 61 is a mobile transceiver 40 comprising the radio transceiver 30 of example 60.

Example 62 is a base station transceiver 50 comprising the radio transceiver 30 of example 60.

Example 63 is a computer program having a program code for performing the method of at least one of the examples 39 to 59, when the computer program is executed on a computer, a processor, or a programmable hardware component.

Example 64 is a machine readable storage including machine readable instructions, when executed, to implement a method or realize an apparatus as exemplified in any pending example.

Example 65 is a machine readable medium including code, when executed, to cause a machine to perform the method of any one of examples 39 to 59.

A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, exemplify the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for controlling", "means for measuring", "means for mixing", "means for converting", "means for storing", etc., may be provided through the use of dedicated hardware, such as "a controller", "a measurer", "a processor", "a mixer", "a determiner", "a storage or a memory", "an input", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry exemplify the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. An adaptation circuit configured to adapt a local oscillator signal in a radio transceiver, the radio transceiver comprising a transmission branch and a reception branch, which are subject to crosstalk, the reception branch comprising a local oscillator configured to generate the local oscillator signal, the adaptation circuit comprising:
 a control module configured to:
 determine crosstalk level information between the transmission branch and the reception branch,
 adapt the local oscillator signal based on the crosstalk level,
 output a control signal for controlling the local oscillator, and
 output an activation signal for the transmission branch.

2. The adaptation circuit of claim 1, wherein the crosstalk level information comprises insulation or attenuation information between the transmission branch and the reception branch.

3. The adaptation circuit of claim 1, wherein the control module is configured to determine the crosstalk level information based on a spectral distance between a transmission band and a reception band of the radio transceiver.

4. The adaptation circuit of claim 1, wherein the control module is configured to determine the crosstalk level information based on a configuration of the radio transceiver in a mobile communication system.

5. The adaptation circuit of claim 1, wherein the control module is configured to adapt a phase noise level of the local oscillator based on the crosstalk level information.

6. The adaptation circuit of claim 1, wherein the crosstalk level information comprises transmission power information on a transmission power used in the transmission branch.

7. The adaptation circuit of claim 1, wherein the control module is configured to adapt at least one of the group of a power supply, an amplitude, a drive strength, a supply current, a swing and a slew rate of the local oscillator based on the crosstalk level information.

8. The adaptation circuit of claim 1, comprising a measurement module configured to determine signal quality information in the reception branch, and wherein the control module is configured to control the measurement module.

9. The adaptation circuit of claim 8, wherein the measurement module comprises an analog-digital converter or a wideband receive signal strength indicator module.

10. The adaptation circuit of claim 8, wherein the control module is configured to adapt the local oscillator signal using the control signal based on the signal quality information.

11. The adaptation circuit of claim 1, comprising a storage module configured to store adaptation information for the local oscillator.

12. The adaptation circuit of claim 11, wherein the adaptation information comprises setting or configuration information for the local oscillator.

13. The adaptation circuit of claim 1, wherein the control module is configured to:
activate the transmission branch,
set a local oscillator frequency to a transmission frequency, and
determine the crosstalk level information based on a signal level of the transmission frequency in the reception branch.

14. The adaptation circuit of claim 13, wherein the reception branch comprises an analog-digital converter, and wherein the control module is configured to determine the signal level of the transmission frequency by evaluating a digital output of the analog-digital converter.

15. The adaptation circuit of claim 1, wherein the control module is configured to:
activate the transmission branch,
set a frequency of the local oscillator in the reception branch to a reception frequency, and
determine the crosstalk level information between the transmission branch and the reception branch based on receive signal strength indicator information.

16. The adaptation circuit of claim 1, wherein the control module is configured to:
activate the transmission branch and set the transmission branch to maximum transmission power,
set a frequency of the local oscillator in the reception branch to a reception frequency, and
determine the crosstalk level information between the transmission branch and the reception branch based on a change in a receive sensitivity of the reception branch dependent on a power setting of the local oscillator.

17. The adaptation circuit of claim 1 further comprising a mixer, which is coupled to the local oscillator.

18. An apparatus consisting essentially of the radio transceiver comprising the adaptation circuit of claim 1.

19. A mobile transceiver comprising the apparatus of claim 18.

20. An adaptation method for adapting a local oscillator signal in a radio transceiver, the radio transceiver comprising a transmission branch and a reception branch, which are subject to cross-talk, the reception branch comprising a local oscillator configured for generating the local oscillator signal, the adaptation method comprising
determining crosstalk level information between the transmission branch and the reception branch;
adapting the local oscillator signal based on the crosstalk level information;
outputting a control signal for controlling the local oscillator; and
outputting an activation signal for the transmission branch.

21. A method for fabricating an apparatus consisting essentially of the radio transceiver comprising the method of claim 20.

22. A method for operating an apparatus consisting essentially of the radio transceiver comprising performing the method of claim 20 on demand.

23. A non-transitory machine readable storage including machine readable instructions, that, when executed, implements the method of claim 20.

* * * * *